United States Patent [19]

White

[11] 4,048,400

[45] Sept. 13, 1977

[54] MULTICELL ELECTRIC BATTERIES

[75] Inventor: Charles Arthur John White, Redditch, England

[73] Assignee: Chloride Group Limited, London, England

[21] Appl. No.: 683,210

[22] Filed: May 4, 1976

[30] Foreign Application Priority Data

May 6, 1975 United Kingdom ............... 18986/75

[51] Int. Cl.$^2$ ........................................... H01M 2/24
[52] U.S. Cl. .................................................. 429/160
[58] Field of Search ............... 429/152, 153, 149, 160, 429/210

[56] References Cited

U.S. PATENT DOCUMENTS

| 1,712,897 | 5/1929 | Morrison | 429/149 |
| 3,003,013 | 10/1961 | Duddy | 429/210 |
| 3,723,181 | 3/1973 | Oakley | 429/210 |
| 3,814,632 | 6/1974 | Miyagawa | 429/160 |
| 3,817,788 | 6/1974 | Eckerbom et al. | 429/160 |

Primary Examiner—Donald L. Walton
Attorney, Agent, or Firm—Watson, Cole, Grindle & Watson

[57] ABSTRACT

A multicell electric battery has an intercell partition, the faces of which comprise two parallel conducting sheets connected together, as by spot welding, by means of one or more symmetrically positioned dimples, which constitute intercell connectors. Each conducting sheet is electrically connected to the adjacent electrode plate either directly or indirectly by means of a compressible conducting cushion which contacts the sheet and either the adjacent plate or a further sheet which is electrically connected to the adjacent plate.

The invention also includes a method of assembling a multicell electric battery which includes sliding the plates of each cell as a unit incorporating contacts into a battery casing also incorporating contacts, the intercell and/or terminal connections being effected by sliding engagement between the contacts of the plate unit and those of the casing.

9 Claims, 7 Drawing Figures

MULTICELL ELECTRIC BATTERIES

This invention relates to multicell electric batteries.

According to one aspect of the present invention a multicell electric battery has two or more electrode plates of each polarity in each cell and an intercell connector moulded onto the intercell partition comprising two spaced parallel conducting sheet portions forming opposite faces of the partition and one exposed to each cell, and at least one conducting bridge passing through the partition at a position remote from the edges of the sheet portions and electrically connecting them, each sheet portion being directly or indirectly connected by pressure contact to the adjacent electrode plate at points distributed over a substantial portion of its area while the said plate is electrically connected to at least one other electrode plate of the same polarity in the cell.

The sheet portion may be connected to the adjacent electrode plate at points distributed over at least half the area of the latter.

Conveniently the sheet portion of an intercell connector may be connected to the adjacent plate through a conducting cushion, the parts being such as to compress the cushion to cause it to exert contact pressure on the sheet portion and the plate.

According to a further aspect of the invention a method of assembling a multicell electric battery includes assembling the plates of each cell as a unit including contacts and sliding them into a casing having contacts incorporated in it, the intercell and/or terminal connections being effected by sliding engagement between the contacts of the plate unit and those of the casing.

The invention may be put into practice in a number of ways, but one specific embodiment and a number of modifications thereof will now be described in more detail by way of examples as applied to a battery of nickel cadmium alkalinetypes with reference to the accompanying drawings in which.

Figure 1:
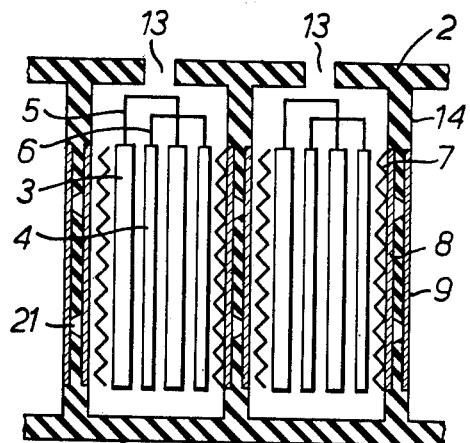
FIG. 1 is a schematic partly sectional elevation of two cells of a multicell electric battery constructed in accordance with the invention.

As shown in part in FIG. 1, the battery is contained in a moulded plastic monobloc casing 1 formed with intercell partitions 14 between neighbouring cells and a lid 2 affording a number of filling holes 13, one communicating with each cell through which liquid may be introduced and gas generated within the cell may exhaust. Each cell is provided with two positive electrode plates 3 and two negative electrode plates 4 intercalated with suitable separators of conventional form which are not shown. As each cell has the same number of plates of each polarity when the plates of a cell are assembled a positive plate will be exposed on one side and a negative plate exposed on the opposite side. The plates of each polarity are connected together by plate straps 5 and 6 of conventional form.

Figure 3:
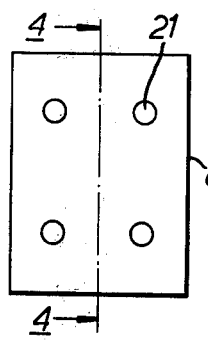
FIG. 3 is an elevation of one of the sheet portions shown in FIGS. 1 and 2.
Figure 4:
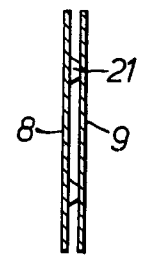
FIG. 4 is a section of the sheet portion of FIG. 3 taken along the line 4—4, and shown joined to a cooperating portion.

During the moulding of the casing each intercell partition has molded into or on to it an intercell connection. This comprises two sheet portions 8 and 9 one of which is formed with four dimples 21 projecting towards the other sheet portion so as to space them apart in parallel plates, the dimples being spot welded to the companion sheet as shown in FIGS. 3 and 4. The dimples are positioned symmetrically on the sheet, each being spaced one quarter of the width of the plate from the edge of the plate and one quarter of the length from the end of the plate. The assembly of the two sheets is placed between the core blocks of the container molding tool, so that when the plastics material is injected into the mold these sheets become embodied in the intercell partition, forming a facing layer extending over the major part of the area of each face of the partition. The sheet portions of this intercell connection are formed of nickel, but they may also be formed of nickel plated steel. The length and width of the sheet portions correspond to those of the electrode plates.

The positive and negative plates 3 and 4 for each cell are assembled together in the usual way with separators (not shown) a piece of expanded metal 7 is placed on either side of the group to form a conducting cushion, and the assembly is then inserted into the container 1. The length and width of each expanded metal cushion corresponds approximately to the length and width of the electrode plates. The thickness of the stack in relation to the cell is such that the expanded metal is slightly compressed to form a snug fit in the cell, and maintain contact between the expanded metal and the sheet portions of the intercell connectors on the one hand and the outer-most electrode plates on the other hand.

The expanded metal is sufficiently resilient to provide a snug fit, while the projections on it penetrate any slightly oxidation or even possibly a thin film of plastics material which may inadvertently be formed on the metal sheet portions.

Figure 2:
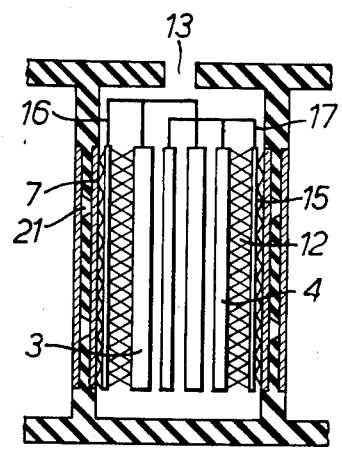
FIG. 2 is a similar view of a modified construction of battery.

FIG. 2 shows a modification of the embodiment shown in FIG. 1 in which the combined thickness of the plates 3 and 4, the separators and the expnded metal 7 is insufficient to fill the cell, because, for example, the same container is to be used for batteries of different capacities. The expanded metal conducting cushions 7 instead of engaging the outer-most electrode plate, engages a plain sheet of metal 15 of nickel or nickel plated steel which is connected through a plate strap 16 or 17 to the electrode plates and is spaced from the outer-most electrode plate by a cushion 12 of a resilient material such as rubber, plastics or a metal or plastics spring member which is porous at least on the side which lies against the electrode plate. The dimensions of this cushion are chosen so that it is slightly compressed when the whole assembly is inserted into the container cavity, thereby ensuring a firm fit.

Figure 5:
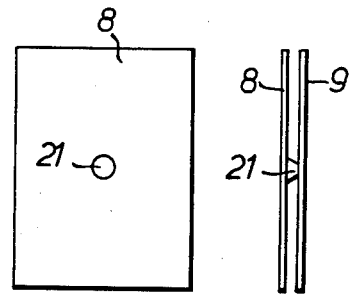
FIGS. 5 and 6 are two views similar to FIGS. 3 and 4 but of a modified form of sheet portion.
Figure 6:
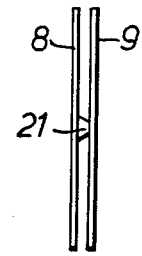

FIGS. 5 and 6 show an alternative construction of sheet portion, in which only one dimple is provided in the geometrical center of the sheet. This has the advantage that the path available for any leakage current is as long as possible, as is described in more detail below, but has the disadvantage that the two sheet portions welded together may be somewhat unstable having only one point of contact.

Figure 7:
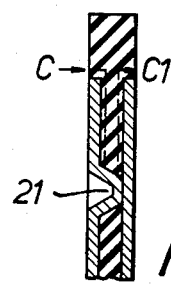
FIG. 7 is a schematic diagram showing the current leakage path between two cells.

FIG. 7 illustrates the only possible leakage path for current, shown by the dotted line C-C. The leakage current is obliged to flow down oneside of a sheet portion, across a dimple and then back up the other sheet portion. The maximum benefit is therefore achieved when each dimple is as far as possible from an edge of each sheet portion.

It will be appreciated that the end cells of the battery are similar to the intermediate cells, except that the end plates are provided with terminal posts extending through the top cover which is secured to the battery in a conventional manner.

It will also be appreciated that a number of modifications may be made without departing from the scope of the invention, for instance, the dimples may be afforded by one or both of the sheet portions.

Each intercell connector may have only one dimple formed on one sheet portion or it may have a number of dimples either all formed on one sheet portion or some formed on one and some on the other. Thus for example all the sheet portions may be initially identical with say two dimples formed on one diagonal so that when one is inverted the four dimples will be at the corners of a rectangle. In any event the dimples are all remote from the edges of the sheet portions so as to present a long leakage path, many times the thickness of the partition, between one cell and the other.

In a specific example the thickness of the sheet portions is from ¼ to 1 mm, the total thickness of the partition being from 2 to 6.5 mm. The four dimples may be spaced from the vertical edges by from a quarter to a third of the width and from the horizontal edges by from a quarter to a third of the height of the plate.

Each cell may have any desired number of electrode plates and the pieces of expanded metal may be larger than the electrode plates and may extend to the edges of the container and be located by them. Although the invention has been described as applied to Nickel Cadmium alkaline cell, it is also applicable to cells of other types.

What I claim as my invention and desire to secure by Letters Patent is:

1. A multicell electric battery comprising a number of intercell partitions, each separating a pair of adjacent cells, two or more electrode plates of each polarity in each cell and an intercell connector associated with each intercell partition comprising two spaced parallel conducting sheet portions forming opposite faces of the partition one exposed to each cell, and at least one conducting bridge passing through the partition at a position remote from the edges of the sheet portions and electrically connecting them, each sheet portion being directly or indirectly connected by pressure contact to the adjacent electrode plate at points distributed over a substantial portion of its area and said plate is electrically connected to at least one other electrode plate of the same polarity in the cell.

2. A battery as claimed in claim 1 in which the sheet portions are connected to the adjacent electrode plate at points distributed over at least half the area of the latter.

3. A battery as claimed in claim 1 in which the sheet portion of an intercell connector is connected to an adjacent plate through a conducting cushion, the parts being such as to compress the cushion to cause it to exert contact pressure on the sheet portion and the plate.

4. A battery as claimed in claim 3 in which the plate adjacent the sheet portion is an electrode plate.

5. A battery as claimed in claim 3 in which the plate adjacent the sheet portion is electrically connected to an electrode plate and separated from it by a resilient cushion, at least the surface layer of said cushion in contact with the electrode plate, being porous.

6. A battery as claimed in claim 1 in which each conducting bridge comprises a dimple afforded by one of the sheet portions and welded to the other sheet portion.

7. A battery as claimed in claim 6 in which each sheet portion affords two dimples, thus providing four conducting bridges per intercell partition.

8. A battery as claimed in claim 7 in which the four dimples are spaced from the vertical edges by from one quarter to one third of the width and from the horizontal edges by from one quarter to one third of the height of the plate.

9. A battery as claimed in claim 1 in which the thickness of the sheet portions is from ¼ mm to 1 mm, and the total thickness of each intercell partition is from 2 mm to 6.5 mm.

* * * * *